United States Patent [19]

McMullen

[11] 3,945,654

[45] Mar. 23, 1976

[54] CHUCK JAW AND SPINDLE ALIGNMENT ATTACHMENT

[75] Inventor: Galen B. McMullen, Culver City, Calif.

[73] Assignees: Christopher Salminen; Dominick A. Whitsel, both of Los Angeles, Calif.; part interest to each

[22] Filed: Apr. 23, 1974

[21] Appl. No.: 463,356

[52] U.S. Cl. ............... 279/123; 33/181 R; 279/1 L; 279/1 SJ
[51] Int. Cl.² ..................................... B25B 31/12
[58] Field of Search ........... 279/1 A, 1 R, 1 SJ, 1 L; 82/34, 45; 33/181 R, 178

[56] References Cited
UNITED STATES PATENTS

| 685,288 | 10/1901 | Miller | 33/181 R |
|---|---|---|---|
| 2,464,070 | 3/1949 | Carcelli | 33/178 |
| 2,905,477 | 9/1959 | Buck et al. | 279/123 |
| 2,925,282 | 2/1960 | Borsetti | 279/1 SJ X |
| 2,994,539 | 8/1961 | Farnsworth | 279/1 SJ |
| 3,104,474 | 9/1963 | Rehart | 33/181 R |
| 3,160,042 | 12/1964 | Grand | 279/1 SJ X |

FOREIGN PATENTS OR APPLICATIONS

| 787,083 | 9/1935 | France | 33/181 R |

*Primary Examiner*—Donald R. Schran
*Assistant Examiner*—W. R. Briggs
*Attorney, Agent, or Firm*—Howard L. Johnson

[57] ABSTRACT

Provides an annular frame for attachment to the outer end of a circle of soft jaws carried by a radially adjustable chuck of a rotary machining assembly, whereby in spite of looseness or misalignment of the chuck jaws, their soft jaws can then be shaped to hold a subsequent workpiece in absolute alignment with the spindle. Frame has number of movable attachment arms corresponding to the number of jaws, which arms are adjustable along respective radial or arcuate guideways so as to engage the circle of soft jaws when opened to different circumferences. When each arm has two adjustable frame-attachment points, annulus is thereby self-centering. For use with (radially slidable) arms having single frame-attachment point, auxilliary centering device is provided.

3 Claims, 8 Drawing Figures

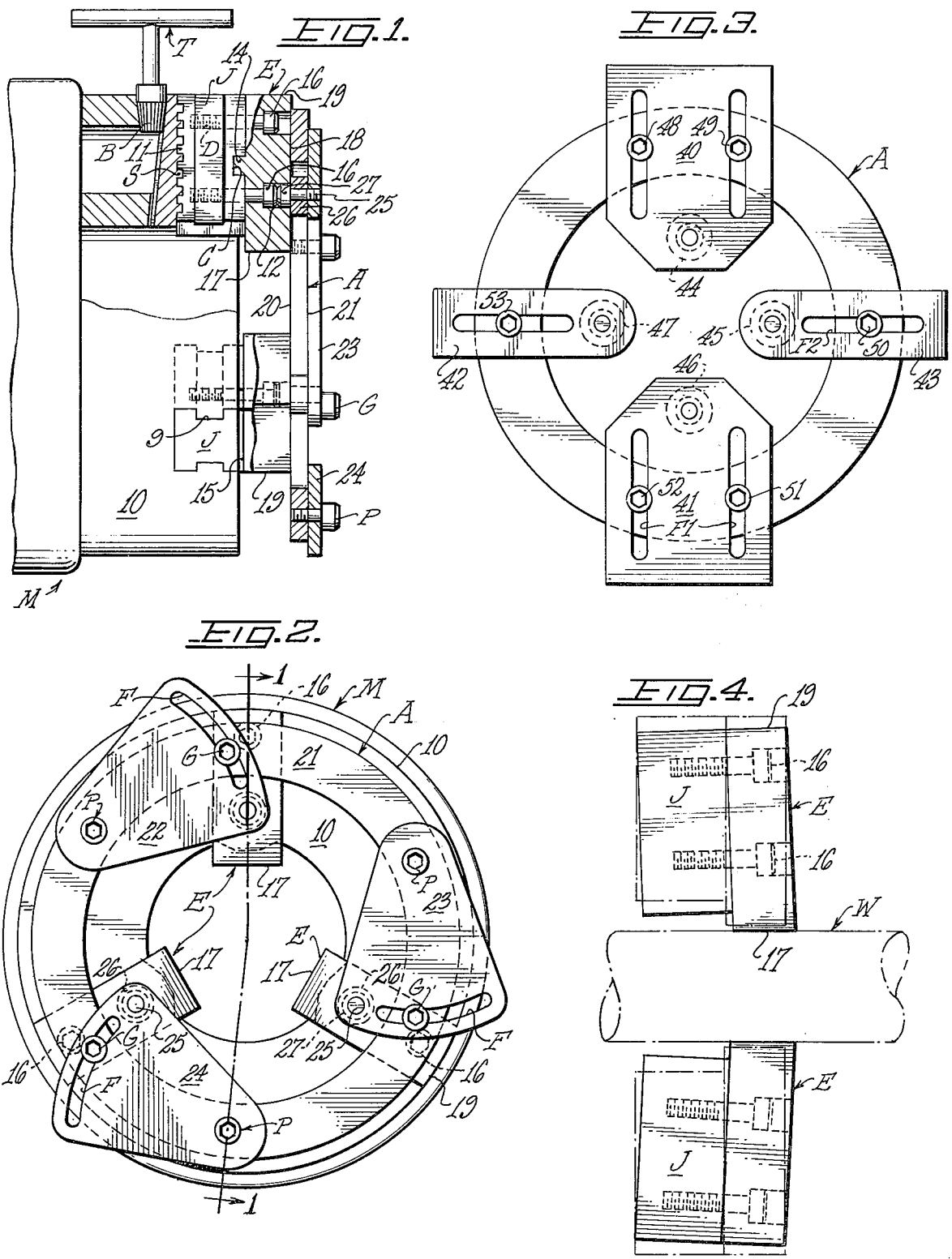

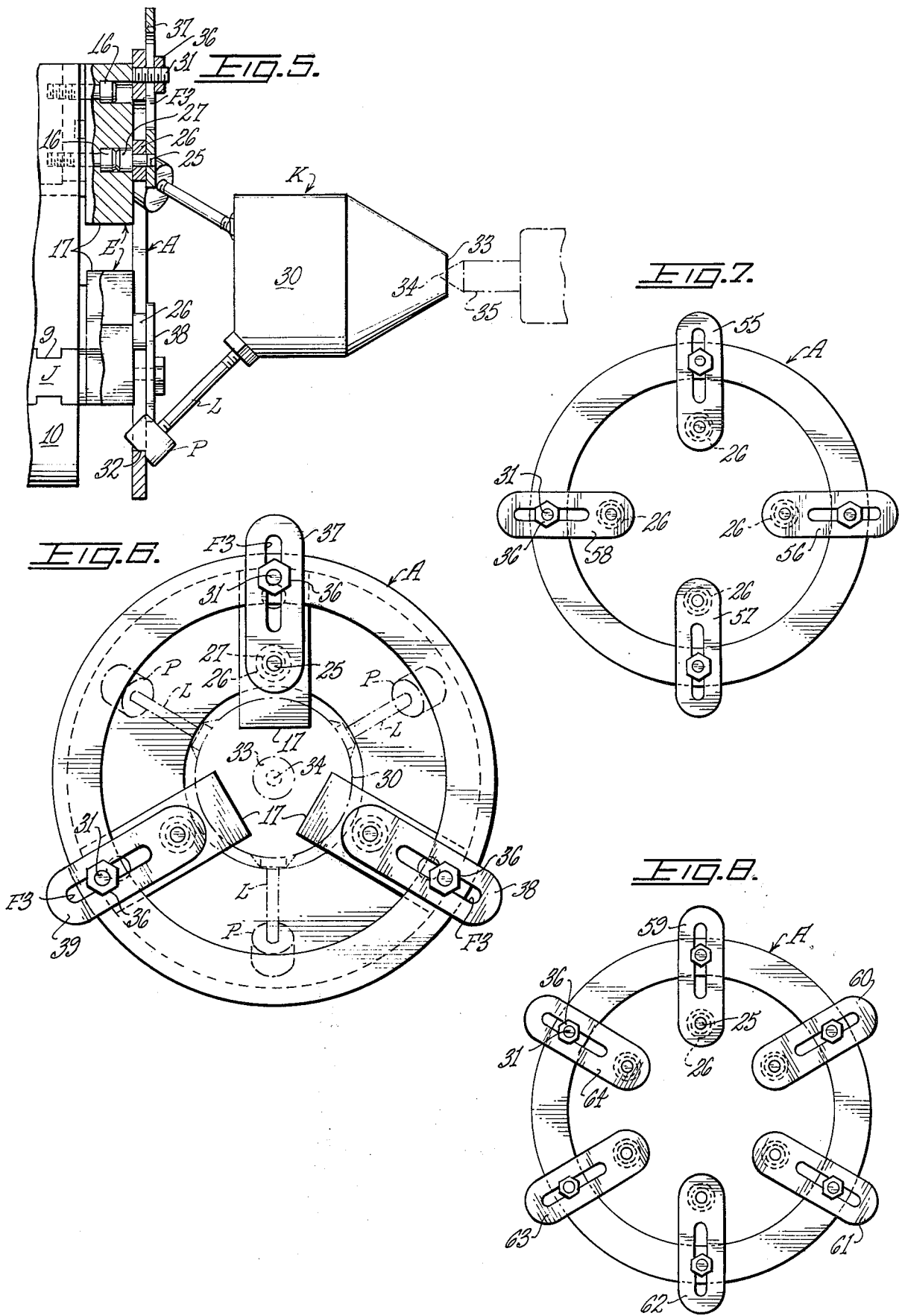

CHUCK JAW AND SPINDLE ALIGNMENT ATTACHMENT

BACKGROUND OF THE INVENTION

Rotary machining devcices such as lathes and grinding machines are customarily equipped with a circle of radially adjustable chuck jaws (of hardened steel) located to grasp and center the workpiece. The jaws are mounted on guideways and opened and closed by simultaneous movement along a helical scroll or track. As such jaws are frequently moved in locating and removing a sequence of workpieces, they gradually become loose in the track and such sloppy fit may allow (or compell) the jaws to tilt unequal amounts when subsequently tightened against the workpiece; the result is that the workpiece and the lathe center or the machining which is performed on the work are not in true axial alignment, although such variance is so small as not to be visually discernable.

For working on material which is easily scratched or marred, such as aluminum workpieces, soft jaws are customarily fastened to the permanent jaws and, to the extent necessary, their contact faces or ends are turned or bored to conform to a (usually cylindrical) workpiece. In such situation, the minute losseness or misalignment of the permanent chuck jaws is magnified in the functional position assumed by the soft jaws.

As a precaution, sometimes a "spider" may be centrally inserted at the base of the chuck; this is a flat disk or plate having a radially extending arm pressed outward against each jaw so as (hopefully) to keep them equally tensioned. In place of the spider, a cammed spacer plate may be provided, as described in U.S. Pat. No. 3,104,474. However, these devices lodged at the base of the jaws do not necessarily correct or equalize the ultimate tilt or eccentricity because (a) they exert much less pressure than that of the jaws when finally clamped tight against a workpiece, and (b) they do not engage the jaws at the outer or free ends which is the area of greatest tilt or misalignment due to leverage extending outward from the base of the jaw. Although the amount of misalignment may be on the order of a few ten thousandths of an inch, such lack of precision may cause the work to be rejected. Eventually the situation is handled by discarding the inaccurate workpieces (when finally checked) and/or by installing a new chuck assembly. Clearly this is not a desirable way of handling the problem.

BRIEF STATEMENT OF THE INVENTION

An open-centered frame, conveniently annular in shape, is provided for attachment to the outer ends of the soft jaws carried by a chuck, the frame being able to accommodate jaws opened to different circumferences, by means of pivotally connected attachment arms equal in number at least to the number of chuck jaws. Each arm has a dependent, cylindrical foot which is pivotally held in a socket such as the counterbore which is conventionally present in the end of each soft jaw. The resulting theoretical ring formed by the sequence of thus-socketed feet, lies on a generally concentric circle which is usually located within the annulus. However, in dealing with a large workpiece which is jaw-engaged internally rather than externally the feet are disposed radially outward from the annulus. In either position, when the chuck jaws are then tightened against the attached frame or annulus with the same force as subsequently applied against the workpiece, the bore or external arc machined in the soft jaws by the spindle will be retained in the same axial alignment when later holding a workpiece (with the frame removed). This is so even though the chuck jaws (when tensioned) were not in true alignment.

Several forms of adjustable attachment arms are provided which are connected to the frame respectively for pivotal swing or for linear (radial) sliding movement along a transverse guideway or slot of the arm. With pivotal arms each having two adjustable frame-attachment points, the circle of chucksocketed feet may be considered self-centering. Alternately, when the radially-slidable attachment arms are incapable alone of centering the annulus, an auxilliary centering device is provided by which the annulus is aligned with the spindle or lathe center before tightening in place.

BRIEF DESCRIPTION OF THE DRAWINGS

FIG. 1 is a side elevational view of the chuck end of a rotary machine with portions in transverse section as viewed along the line 1—1 of FIG. 2, showing one form of the present aligning attachment frame mounted atop three soft jaws which are held by corresponding chuck jaws, with a chuck wrench shown in position to move the positioning ribs of the helical scroll so as to tighten the jaws.

FIG. 2 is a face view of the same seen from the right of FIG. 1.

FIG. 3 is a face view of a modified form adapted for a four jaw chuck.

FIG. 4 is a semi-schematic axial sectional view taken through the form of FIG. 3 with a workpiece held tight by the tensioned soft jaws, with the untilted or loose position of the jaws indicated in phantom.

FIG. 5 is a partial axial sectional view of a three jaw attachment frame, with an auxilliary centering device mounted thereon.

FIG. 6 is a face view of the same.

FIGS. 7 and 8 are face views of respective four-jaw and six-jaw attachment frames.

DETAILED DESCRIPTION OF PREFERRED EMBODIMENTS

As here illustrated, rotary machining tools M, such as lathes and grinding machines are constructed with a coaxially located chuck which provides a circle of master jaws J movable in individual guideways 9 of the body 10 and having arcuate teeth 11 received in a helical track or scroll S, which chuck by manual operation of the beveled rib-engaging end B of a chuck wrench or tool T is moved to constrict or extend the several jaws radially inward or outward so as to engage or release a workpiece (W) which is thus grasped and centered therebetween. The chuck jaws are formed with a plurality of coupling means comprising an outwardly-open transverse groove C and a pair of internally-threaded axially-directed bores D, which receive headed screws, by means of which a set of metallic soft jaws (E) can be coupled to the chuck jaws.

As seen particularly in FIG. 1, a soft jaw E is secured to each chuck jaw J by a transverse rib 14 which projects from the underface 15 of the jaw and is received in the groove C, plus a pair of bolts 16 inserted from the conuterbores 12 into the body of the chuck jaw with the threaded end portion engaging a terminally tapped length of the bore D. Usually the inner ends 17 of the soft jaws collectively engage the workpiece, but sometimes a tubular workpiece is held internally by the outer ends 19 of the jaw.

With the present stabilizer attachment, the outer planar face 18 of each soft jaw is conformingly overlaid by the underface 20 of a ring or annulus A which upon being coupled thereto, forms a rigid transverse enclosure frame holding all the jaws together (and exactly centered as hereafter detailed). The parallel, upper or outer face 21 of the annulus supports a plurality of triangular shaped, swinging arms — in the construction of FIGS. 1–2, three in number, 22, 23, 24 — each having a two point attachment to the frame. Each arm is formed with an arcuate slot F having a headed bolt G projecting upward therethrough from the annulus, which head overlies the edges of the guide slot F so that it can be tightened against the arm to anchor it in a selected position.

Each arm is pivotally secured to the annulus by a pin P and adjacent an opposite corner of the arm is a projecting stubshaft 25 carrying in succession an annular spacer 26 (having the same thickness as the annulus) and a cylindrical foot 27 which latter is receivable in a counterbore 12 (above or resting upon the head of a bolt 16 as the case may be). It will be apparent that the (identical) angle assumed by the several arms 22, 23, 24, like the location of the bolt G along its guideway F, varies with the amount that the soft jaws (or their anchorage sockets 12) are spaced inward from the annulus A. Or expressed another way, one size annulus can accommodate a range of sizes of chuck jaws. More important however, the circle upon which lies the inner ring of counterbores 12 which receive the feet 27, is always concentric to the annulus A by action of the swinging arms 22, 23, 24, so that the annulus and jaws are always concentric.

When the mounted annulus is thus centered, the chuck jaws are tightened against it (by action of the wrench T), causing the inner circle of soft jaws E to assume such degree of outtilted position as made possible by their loose fit, as illustrated in FIG. 4. When held in this position, the soft jaws may then be bored to the contour of the workpiece; subsequently such workpiece located in this bore will be held in true axial alignment for whatever machining is required on it.

Another construction for centering the annulus relative to the circle of soft jaws is illustrated in FIG. 3, for attachment to a four jaw chuck. An opposing pair of adjustment arms 40, 41 are movable linearly only, by reason of a parallel pair of guide slots F1. The two remaining arms 42, 43 need be formed with only single slots F2. With such arrangement, the respective jaw attachment feet 44, 45, 46, 47 locate the annulus concentrically for tightening the circle of nuts 48, 49, 50, 51, 52, 53.

Alternately, single linear slot arms may be used as illustrated in FIGS. 5–8 in association with a separate centering device K, shown in FIGS. 5–6. This consists of a central, conveniently cylindrical or conic body 30 having a trio of angularly diverging legs L of equal length and inclination, and spaced apart equidistant circumferentially. Each leg distally carries a fixed contact pod P having its underface formed with an arcuate groove 32 (FIG. 5) of the same radius of curvature as the inner edge of the annulus upon which it thus rests. The apex end 33 of the body is formed with a central, conic socket 34 which can be moved against the pointed end of a lathe center 35 of the machine M so as to center the device and the annulus with respect thereto.

When thus centered, the jaws E are tightened against the annulus, or more specifically against the anchorage feet 27 of the three arms 37, 38, 39, the feet being anchored in the counterbores of the corresponding soft jaws E. The several nuts 36 are then tightened down on the respective annulus shafts 31 thereby to lock the annulus in this centered and tensioned position. Such auxilliary centering device may be used in the same manner with any of the other forms which lack the self-centering arms of FIGS. 1–2, including the modification of FIG. 3.

I claim:

1. A chuck jaw attachment for holding a set of chuck-connected soft jaws in radially tensioned position for rotationally forming an arcuate work-engaging surface thereon by operation of a coaxial spindle, said attachment comprising:

an open-centered, rigid, enclosure frame having means for removable attachment to the ends of a circle of soft jaws which are carried on radially adjustable chuck jaws generally axially aligned with said spindle, said means comprising a plurality of jaw attachment arms, each adjustably connected to said frame and individually pivotally connected thereto and swingable along an arcuate path radiused therefrom and aligned with a cylindrically projecting foot of the arm which is receivable in a corresponding socket of the outer end of a soft jaw, the frame additionally having anchorage means for securing each arm at a selected position along said arcuate path when the foot-attached soft jaws are located coaxial to said spindle.

2. A chuck jaw attachment according to claim 1 in combination with a rotary machine having a rotary shaft carrying helically movable chuck jaws and corresponding soft jaws mounted thereon, which soft jaws have said chuck jaw aligning attachment functionally attached thereto.

3. The combination comprising a chuck jaw attachment for holding a set of chuck-connected soft jaws in radially tensioned position for rotationally forming an arcuate work-engaging surface thereon by operation of a coaxial spindle, said attachment comprising:

an open-centered, rigid, annular enclosure frame having means for removable attachment to the ends of a circle of soft jaws which are carried on radially adjustable chuck jaws axially aligned with said spindle, said means comprising a plurality of jaw attachment arms each adjustable connected to said frame and each individually having pivotal means for coupling to an end of one of said soft jaws when in varied radial locations with the soft jaws outtilted to the maximum permitted by individual looseness of the supporting chuck jaw, and a centering device comprising a tripod characterized by arcuate-grooved contact feet, the grooves of which are curved corresponding to that of the annular frame and hence are registrable with an edge thereof, said device further having axial aligning means alignable with the spindle of said machine, whereby said frame may be located coaxial with the circle of soft jaws and spindle.

* * * * *